United States Patent [19]  [11] 4,113,675
Clarke et al.  [45] Sep. 12, 1978

[54] METHYLOLATED KRAFT LIGNIN POLYMER RESIN

[75] Inventors: Michael R. Clarke, Aylmer; Allan J. Dolenko, Ottawa, both of Calif.X

[73] Assignee: Canadian Patents and Development Limited, Ottawa, Canada

[21] Appl. No.: 752,628

[22] Filed: Dec. 20, 1976

[30] Foreign Application Priority Data

Jan. 13, 1976 [CA] Canada ................................. 243397

[51] Int. Cl.² .......................... C08H 5/02; C08G 8/24
[52] U.S. Cl. .................................... 260/17.5; 156/335
[58] Field of Search .......................................... 260/17.5

[56] References Cited

U.S. PATENT DOCUMENTS

| 3,090,700 | 5/1963 | Ball et al. | 117/66 |
|---|---|---|---|
| 3,185,654 | 5/1965 | Ball et al. | 260/17.5 |
| 3,454,508 | 7/1969 | Herrick et al. | 260/17.5 |
| 3,864,291 | 2/1975 | Enkvist | 260/17.5 |

Primary Examiner—Harold D. Anderson
Assistant Examiner—E. A. Nielsen
Attorney, Agent, or Firm—Bacon & Thomas

[57] ABSTRACT

A highly cross linkable methylolated kraft lignin resin for use as a high wet strength adhesive and the like, in which premethylolated kraft lignin of kraft or soda black liquor is combined with a phenolic cross linking agent, which is optionally methylolated, at a pH in the range of pH 4 to pH 7. The lignin is methylolated under alkaline conditions and then may either be acidified to provide an aqueous dispersion or dissolved in a fugitive base such as ammonium hydroxide so as to be brought into close association with the mutually soluble phenolic cross linking agent. The resin is cross linked by conventional heat curing techniques.

22 Claims, 1 Drawing Figure

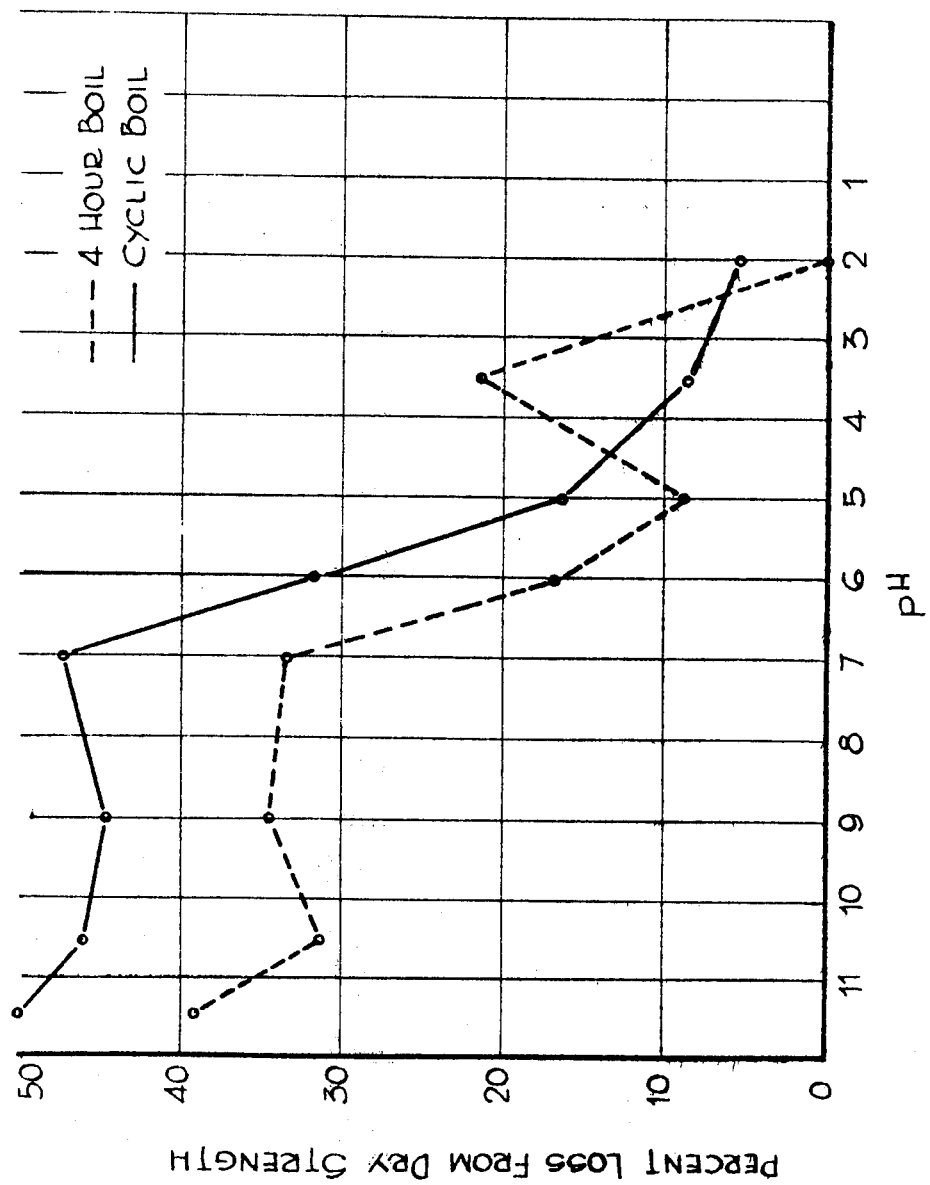

METHYLOLATED KRAFT LIGNIN POLYMER RESIN

This invention relates to kraft or soda black liquor adhesives and resins. More particularly this invention relates to methylolated kraft lignin resins such as methylolated lignins which can be highly cross linked with phenolic cross linking agents.

In the manufacture of plywood, particle board and the like, large quantities of polymer resins are required as adhesives, coatings and fillers. Such polymer resins which include formaldehyde and phenol or urea are usually derived from petro chemical sources and are consequently relatively expensive, relative to the value of the finished product. In addition, the resistance against moisture of urea base adhesives is restricted. Because of the similarity of its chemical structure to phenolic resins, numerous proposals have been made to modify kraft lignin, among other lignins by reaction with chemicals which promote cross linking of the lignin molecules. Such cross linked lignins may be used as extenders in phenolic resins, but their use is limited because large amounts of phenol must be used. Generally, phenol and lignin are present in the proportion 1:1. Further, the isolation of lignin from kraft black liquor is relatively expensive and involves an acid precipitation step. Unfortunately, the reactivity of the lignin molecules is relatively low and heretofore it has proved difficult, if not impossible, to effect sufficient cross linking to achieve good resin properties, and in particular wet strength properties.

Herrick et al. in U.S. Pat. No. 3,454,508 issued July 8, 1969 propose a thermosetting phenolic resin which comprises a water-insoluble alcohol-soluble polymethylol phenol, having a mol ratio of 2.3 to 2.52 of formaldehyde to phenol, in the form of a heavy syrup which is condensed with an acid precipitated alkali lignin in a fugitive base such as ammonia. There is, however, no suggestion in this reference of cross linking of the polymethylol phenol with the lignin and, as noted hereinbefore, cross linking is unlikely because of the relatively low reactivity of the lignin molecule.

Ball et al., in U.S. Pat. No. 3,185,654 issued May 25, 1965, similarly suggest a phenolic resin in which an alkaline catalysed A stage resole (the water soluble product of a primary methylol substitution on the benzene ring of phenol) is condensed in a solvent solution, such as methanol, with an alkali lignin in the free acid form, at a pH in the range of 3 to about 7 and preferably 3.5 to 5.5, so as to effect reaction between free methylol groups of the resole with hydroxyl groups in the lignin. Here again, however, the reactivity of the lignin molecule is so low and the reaction between the lignin and methylolated phenol so slow that very little cross linking can or does take place, in the solvent solution, one result of which is that the wet strength of the resin (as measured by a standard cyclic boil test) is relatively low.

It is known that one way to increase the reactivity of lignin molecules is to introduce more reactive hydroxyl groups by methylolation with formaldehyde, and combinations of methylolated kraft lignin with methylolated phenols have heretofore been examined as adhesives for plywood, particle board and the like. In U.S. Pat. No. 3,864,291 issued Feb. 4, 1975 to Enkvist there is described a process in which kraft or soda black liquor is methylolated with formaldehyde under alkaline conditions and then condensed at a pH of 7 to 11, preferably 8 to 10, with a separately alkali prepared phenol or cresol formaldehyde, such that the phenol or cresol represents about 15 to 50% of the mixture. For reasons which will be described in more detail hereinafter, only a very limited amount of cross linking between the methylolated liquor and the phenol (or cresol) formaldehyde occurs, resulting in an adhesive having a relatively low wet strength after boiling.

It will be appreciated that lignin is a relatively complex molecule and the mechanisms by which it undergoes condensation are not fully understood. It is believed, however, that condensation is largely by catalysis and this is certainly borne out by Enkvist and Ball who employ relatively high and low pH respectively. It is known that catalysis increases with increasing alkaline (high) pH and also increases with increasing acid (low) pH, whereas at neutral pH (pH7) the condensation system is relatively unreactive.

It has not heretofore been recognized that in order to achieve a high level of cross linking density of lignin molecules, all three of the following requirements must, of necessity, be met:

(i) the kraft or soda lignin, whether contained in a black liquor or acid precipitated therefrom, must be pre-reacted with a methylolating agent, such as formaldehyde, paraformaldehyde, hexa methylenetetramine or compounds which may be readily decomposed to formaldehyde, under alkaline conditions, so as to introduce methylol groups to the lignin molecule;

(ii) phenolic cross linking agents, which may or may not contain free methylol groups, must be employed; and (iii) the methylolated lignin and the phenolic cross linking agent must be brought together into molecular association by mutual dissolution, which can only be accomplished at a pH of less than 7, where rapid cross linking can occur. As the compositions are not particularly soluble in water in the acid pH region, it is usually necessary to employ an organic solvent such as methanol or to employ a fugitive base such as ammonia or to employ an aqueous dispersion.

When the aforesaid conditions are fulfilled it has been found that highly cross linked resins which exhibit markedly superior wet strengths, as evidenced by a cyclic boil test, compared to lignin resins heretofore available can be produced.

Thus, it is one object of the present invention to provide an improved, inexpensive, resin composition for use as an adhesive, moulding powder coating composition or the like, based upon a methylolated kraft or soda lignin polymer resin system which can contain 5 to 90% by weight of lignin and which exhibits higher wet strength after boiling than heretofore possible.

It is another object of this invention to provide a process for making the aforesaid resin composition.

By one aspect of this invention there is provided a process for producing a highly cross linkable methylolated kraft lignin resin which comprises combining kraft or soda lignin under alkaline conditions with a methylolating agent to thereby produce methylolated lignin and subsequently reacting said methylolated lignin with a phenolic cross linking agent at a pH below 7.

By a second aspect of this invention there is provided a process for producing a highly cross linked methylolated kraft lignin polymer resin which comprises: reacting an alkaline solution of kraft lignin with formaldehyde at room temperature for a period of at least three days to thereby produce methylolated kraft lignin, adjusting the pH of the solution to the range 5–7 adding at least 5% by weight of total resin solids of phenol formaldehyde at a pH of 6.0 to 7.0, and stirring for a sufficient time to thereby produce said polymer resin.

By another aspect of this invention there is provided a highly cross linkable methylolated kraft lignin resin for use as a high wet strength adhesive, comprising the combination of pre-methylolated kraft lignin with a phenolic cross linking agent which is produced at a pH in the range 2–7.

The invention will now be described in more detail hereinafter with reference to the examples and to the drawings in which the sole FIGURE is a graph showing percentage loss from dry strength of the resin as a function of the pH of curing.

The lignin component of the system according to this invention is generally derived from a kraft process black liquor. In the kraft process for producing wood pulp, sodium sulphate ($Na_2SO_4$) is reduced by heating with carbonaceous matter in a furnace to form sodium sulphide ($Na_2S$) which is then used in water solution with sodium hydroxide (NaOH), for digestion of soft-wood chips in a digesting tank at high temperature and pressures. The spent solution, which is highly alkaline, odoriferous and black due to the entrained lignins and other impurities, is known as black liquor. As black liquors from the soda process are also alkaline and contain essentially the same alkali lignins and products of alkaline degradations of wood, it is obvious that black liquors from the soda process, where sodium hydroxide is the active reagent, can also be used as the starting material in the present invention. For simplicity, this specification will refer hereinafter to black liquor which term will include both soda and kraft process black liquors from the digestion of mixed or single species soft-woods, such as fir, spruce and pine.

Crude kraft liquor contains approximately, in percent of total solids, 40% lignin, 36% hemicellulose and acids from carbohydrates, 3% extractives, 3% sulphur and 16% sodium, and the lignin can, if desired, be precipitated from the crude liquor with acid to give near colloidal size particles. The molecular weight of the precipitated lignin is approximately:

| | | | |
|---|---|---|---|
| number average | $\overline{Mn}$ | ≈ | 1600 |
| weight average | $\overline{Mw}$ | ≈ | 3500 |
| and the degree of polydispersity | $\dfrac{\overline{Mw}}{\overline{Mn}}$ | ≈ | 2.2 |

Crude kraft liquor or precipitated lignin can be methylolated by stirring, at room temperature, with formaldehyde in any convenient form such as formalin (35% solids).

The ratio of lignin to formaldehyde is preferably in the range 1:12 to 1:18 and the reaction is continued for several days (usually three days minimum at room temperature, or for a lesser time at elevated temperature) after which time the solids content in the methylolated crude is approximately 50%. When elevated temperatures of the order of 70° C. are employed, the reaction time is reduced to about 20 hours.

The cross linking agent may be formed from phenol, cresol, catechol, resorcinol, with alkyl or aryl substituted compounds of these monomers and condensed forms of these monomers with one of aldehydes and ketones. As is well known, the reaction of phenol and formaldehyde with alkaline catalysts favors the formation of primary mono- and polymethylol derivatives. Subsequent condensation takes place more slowly:

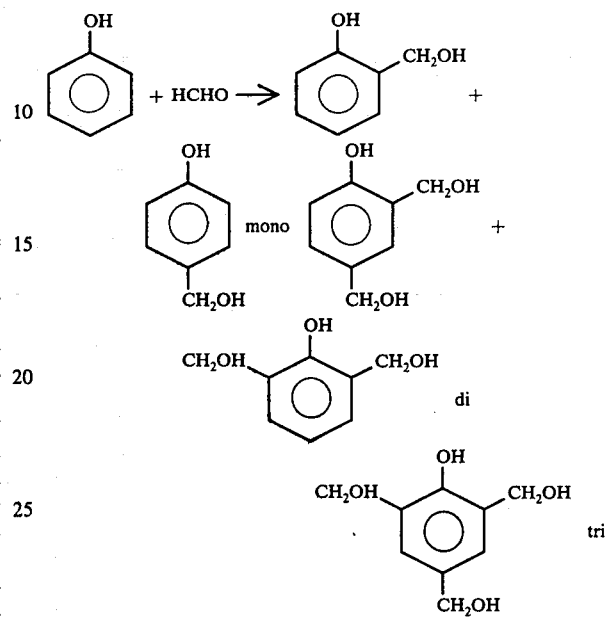

These precursors self-condense to form methylene ethers which further react to give methylene bridged polymers: e.g.,

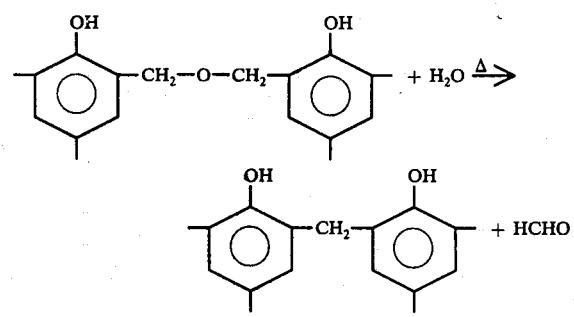

Under acid catalysts the formation of the above polymethylol derivatives is not favored as they self-condense as soon as they are formed. It is common to produce the polymethylols under alkaline catalysis and then condense under acid catalysis. The rate of the condensation reaction increases with the acid concentration.

Novolac resins are produced under acid catalysis where phenol is in excess: e.g.,

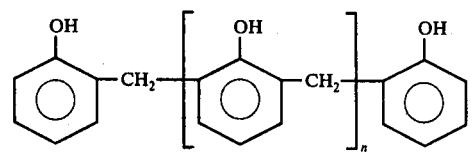

Phenolic compounds which may be condensed with methylolated kraft lignin or which may be methylolated and then condensed include:

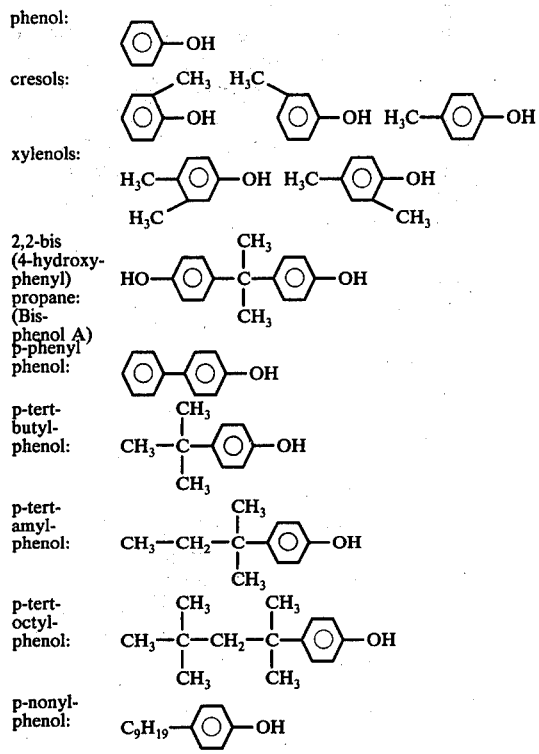

Having prepared a methylolated lignin product and selected a phenolic cross linking agent which may or may not be methylolated, it is necessary to combine the lignin product with the cross linking agent at an acid pH in the range 2 to 7. Normally the methylolated lignin separates as a colloidal dispersion in the pH range 2–7, however when the phenolic cross linking agent is added, a mutual solution of the lignin and phenolic results in either the separation of a coarse lignin-phenolic precipitate or a viscous liquid comprising the lignin-phenolic solids. This resinous material complex may be readily separated from impurities such as sugars and salts by filtration or decantation. This resinous material can then be applied or utilized in the form of a powder, an aqueous suspension, dissolved in an organic solvent such as methanol, or dissolved in a fugitive base such as ammonium hydroxide, for final curing or cross linking. The amount of cross linking agent in the resin mixture may range from 1:10 to 10:1 of total resin solids. In the case of a fugitive base, the pH will eventually reach acidic values as the base is lost during application and curing. During the cross linking reaction the cross linking agent and the methylolated lignin must be in close molecular association and, as will be more apparent from the detailed examples hereinunder, in order to achieve this the pH should be below 7. In instances where the combined lignin phenolic material complex is separated from the residual liquors containing sugars and salts the pH may be allowed to rise somewhat above the preferred pH 7 level. Similarly where the lignin is sufficiently reactive to become highly cross linked and give the desired water resistance the pH may be allowed to rise somewhat above 7 for final curing. The desired water resistance is achieved when a 3-ply birch plywood assembly is capable of withstanding 360 psi shear test after being subjected to a cyclic boil test (C.S.A. Standard 01126-1961). At pH levels below 7 it is believed that the nature of the curing of the resin changes from a catalysis reaction to one dependent upon the degree of association of the cross linking agent with the methylolated lignin. With conventional phenolic systems reactivity increases with pH from 7 up to about 14, but from FIG. 1 it is clear that at pH 7 a remarkable change occurs with the system of the present invention. FIG. 1 shows, as explained in more detail in Example 7 hereinafter, the effect of pH on the curing mechanism on 2-ply birch plywood. At alkaline pH 10.5 the wet strength (as measured by a cyclic boil test) of the plywood is only about 50 percent of the dry strength of the plywood whereas at pH 5 the wet strength increases to about 85% of the dry strength and at pH 2 the wet strength is about 95% of the dry strength.

A further advantage deriving from the combination of the methylolated lignin and phenol formaldehyde at acid pH values resides in the ease of separation of the resinous materials of the present invention from the mother liquors. As indicated hereinabove black liquors contain other constituents in addition to lignin, such as sugar and hemicellulose which must be separated from the resinous materials used as adhesives. At acid pH values most such other constituents are relatively soluble but depending upon dilution and specific composition, the relatively insoluble resinous materials are recovered as a filterable precipitate or as a resinous mass.

EXAMPLE 1

Preparation of methylolated lignin

250 Parts of crude kraft liquor containing 52% solids (i.e. 130 parts solids) and having pH 12–12.5 was stirred with 40 parts of formalin containing 35% solids (14 parts solids) for three days at room temperature. At the end of that time the methylolated crude was found to contain 50% solids, the ratio of lignin to formaldehyde was 1:12 assuming 48% of total solids to be lignin (as determined spectrophotometrically) and the molecular weight to be 1600.

EXAMPLE 2

420 Parts of Indulin-AT ® by Westvaco—an acidified and purified lignin with an ash content of less than 1 percent—was mixed with 1050 parts of 1N NaOH and 420 parts of formalin (35% solids), and stirred at room temperature for three days. Methylolated lignin was then precipitated by the slow addition of acetic acid. The precipitate was filtered, washed and stored wet (30% solids or more). The ratio of lignin to formaldehyde was 19:1, at an assumed molecular weight of 1600.

EXAMPLE 3

Preparation of Phenol-Formaldehyde Resoles (a) These resoles were prepared at different levels of dilutability in water. Resole with low dilutability:

355.1 g of phenol (90% phenol), 386.4 g of formaldehyde (47.5% solution prepared by heating paraform in water) and 32 g of methanol were combined in a glass reactor equipped with condensor, stirrer, thermometer and heating mantle. The pH was adjusted to 9.0 with the addition of an aqueous solution of 33% sodium hydroxide. The solution was heated gently to 50° and the heating source removed. The temperature was allowed to rise to 58°–60° and the temperature then controlled by pulling a vacuum on the system as required to maintain the temperature at 60°–62° until the exothermic reaction ceased (approximately ¾ hour). The solution was then heated under normal atmospheric conditions and refluxed for 1 hour. During this reflux period the pH was maintained at 9.0 with the addition of the sodium hydroxide as required. After refluxing the heat was removed and the solution cooled rapidly to 58°–60° by pulling a vacuum on the system. The pH of the solution was adjusted to 6.7 to 7.0 with the addition of an aqueous solution containing 67% PTSA (approximately 45 ml required). Properties of this resin were:

phenol-formaldehyde ratio 1:1.8
pH—6.7
solids—52.0%
viscosity—120 cps (Brookfield at 25°)
dilutability—essentially zero Dilutability is an indication of the water tolerance of the resin, i.e., the volume of water which can be added to a fixed volume of resin without causing precipitation of the resin.

(b) Resole with higher dilutability

This resole was prepared as described above except the refluxing time was reduced to approximately ½ hour.

Physical properties of this resin:
phenol-formaldehyde ratio 1:1.8
pH—6.8
solids—53.8%
viscosity—110 cps (Brookfield 25°)
dilutability in water 1 to 1.2 i.e., 1 ml resin can accommodate 0.2 ml water without precipitation.

EXAMPLE 4

Demonstrating the Necessity of Utilizing Methylolated Lignin in This Invention

Lignin itself is not sufficiently reactive to be cross linked readily by phenolic resins. However, methylolated lignins will react with resoles at elevated temperatures to give a highly cross linked, waterproof resin.

The methylolated crude black liquor and the resole were combined to produce a binder as follows.

To 650 g of the dispersion of methylolated crude lignin obtained as in Example 1, produced from 580 g methylolated crude liquor having a non-volatile solid of 44.5% to which was added 70 g conc $H_2SO_4$, 54.8 g of a resole (52% solids) having a low dilutability in water as in Example 3a was added with high speed mixing. The ratio of methylolated black liquor solids to resole solids is 9:1. With this resole and at this relatively low level of addition a stable dispersion of the binder is maintained. At higher levels of addition or using resoles with greater dilutability an unstable dispersion is obtained (see Example 9).

This binder was used to prepare 3-ply plywood specimens (1 ft × 1 ft) using ⅛ inch poplar veneers and pressing at 350° F. and 150 psi for 10 minutes. The application rate was 8 g of resin solids per square foot of glue line. Shear specimens were prepared from these panels and then subjected to one or more of the following tests.

(1) dry bond strength
(2) wet bond strength after boiling the specimens for 4 hours
(3) wet bond strength after a cyclic boil, i.e. boiling for 4 hours followed by heating at 60°–65° C. for 20 hours followed by boiling for an additional 4 hours.

The average strengths obtained for this binder formulation were:

dry strength 309 psi, wood failure 40%
wet strength 247 psi, wood failure 60%.

The values for wood failure represent a visual estimate of the extent of wood failure occurring when the specimen is broken. The ratings represent an average for all the samples tested (10 or more) rounded off to the nearest 5 percentile. This is a very significant property as it indicates the proportion of wood which is failing as opposed to the binder. A binder dispersion was prepared in exactly the same manner as above starting instead with crude kraft liquor which had not been methylolated, an average dry strength of 254 (0%) was obtained, however, the sample had no wet strength. Strengths are indicated in psi and the value in brackets indicates the extent of wood failure, by visual inspection.

EXAMPLE 5

Demonstrating Same Requirement as in (4) with Free Lignin (Indulin AT)

Kraft lignin in the free lignin form (Indulin ®-AT, Westvaco Chemicals Ltd.) was methylolated as in Example 2. 200 g of the wet methylolated lignin at 30% solids was dissolved in a fugitive base, for example, ammonium hydroxide, and 18 g of the resole (52% solids, example 3) was added. This binder solution was used to prepare 3-ply poplar plywood specimens as previously described. The average dry strength and wood failure for several replicate samples were 319 (60%), 268 (60%), 293 (100%) and 258 (40%) and the corresponding wet bond strengths (4 hour boil) were 194 (40%, 242 (40%), 173 (80%) and 205 (60%).

A similar binder mixture was prepared using instead unmethylolated kraft lignin at the same lignin to resole solids and preparing the poplar plywood samples in the same manner gave an average dry bond strength of 231 (0%). After a 4 hour boil the samples had no wet strength. Even doubling the ratio of resole to lignin solids gave no improvement showing a dry bond strength of 233 (0%) and no wet strength. The failure to obtain any wet strength using unmethylolated lignin while reasonably good wet strengths are obtained using methylolated kraft lignin is taken as evidence that methylolation of the lignin is necessary to increase its reactivity with the resole so that a highly cross linked waterproof resin is obtained on curing.

EXAMPLE 6

Demonstrating Effect of Increasing Levels of Resole

A series of binder dispersions were prepared as in Example 4 changing the proportions of resole solids to methylolated black liquor solids. These binders were used to prepare 3-ply poplar plywood samples as previously described. Shear strengths obtained for these samples are given in the table below along with estimations of extent of wood failure.

Table 1

| Ratio of Methylolated B.L. Solids to Resole Solids | Dry Strengths (psi) | Wet Strengths (psi) |
| --- | --- | --- |
| 100/0 | 239 (20%) | 93 (0%) |
| 95/5 | 261 (40%) | 144 (20%) |
| 90/10 | 278 (80%) | 188 (60%) |
| 80/20 | 305 (80%) | 226 (80%) |

These data show that very substantial increases in wet strengths and substantial wood failure can be obtained at a relatively low level of resole addition.

EXAMPLE 7

Demonstrating the pH Effect on the Ability of the Binder to Form a Highly Cross Linked Resin on Curing (a) A large quantity of binder dispersion was prepared as in Example 4 with a methylolated black liquor solids to resole solids of 90:10 and different pH's by acidifying the methylolated black liquor with conc. HCl to give the approximate pH required, adding the phenol formaldehyde resin and adjusting the final pH.

2-Ply plywood panels were prepared using these dispersions with ⅛ inch birch veneers applying the binders at 8 g per square foot of glue line and pressing at 350° F. and 200 psi for 10 minutes. The shear strengths obtained and extent of wood failure observed as a function of pH of the binder dispersion is given in Table 2.

Table 2

| pH | Dry Strength (psi) | Wet Strength (psi) (4 hour boil) | Wet Strength (psi) (cyclic boil) |
|---|---|---|---|
| 11.5 | 332 (0%) | 202 (0%) | 165 (0%) |
| 10.5 | 712 (10%) | 487 (0%) | 385 (0%) |
| 9.0 | 827 (75%) | 542 (0%) | 460 (0%) |
| 7.0 | 790 (60%) | 524 (0%) | 416 (0%) |
| 6.0 | 787 (80%) | 656 (20%) | 534 (10%) |
| 5.0 | 830 (65%) | 774 (25%) | 696 (20%) |
| 3.5 | 693 (90%) | 547 (40%) | 635 (45%) |
| 2.0 | 627 (70%) | 622 (60%) | 539 (65%) |

A plot showing the percent loss in strength from the original dry strength after the 4 hour boil and cyclic boil tests is shown in FIG. 1.

The steady increase in wet strength as evidenced by the increase in wood failure (Table 2) and the decrease in the percent loss of strength from the original dry strength (FIG. 1) reflects the increasing extent of cross linking which occurs on curing these binders at acidic pH's. This result is unexpected with respect to evidence available in the literature which teaches that acid cured one-stage phenolic resins are in general most stable in the pH range 3–5. FIG. 1 dramatically reflects the increasing cross link density as the pH is adjusted below 7.

(b) Methylolated kraft lignin in the free lignin form was precipitated at pH 4 from its alkaline solution and filtered (see example 2). 500 g of the wet precipitate containing 30% non-volatile solids was dissolved in 100 g concentrated ammonium hydroxide (approximately 28% NH₃). In 100 g of this solution 3.3 g resole of low dilutability (52% non-volatile solids) was dissolved. The ratio of total solids of the methylolated lignin to total resole solids in this solution was 14.5 to 1. 3-ply poplar plywood samples were prepared as previously described using an application rate of 8 g binder solids per square foot of glue line. The average shear strengths obtained for several replicate samples were as follows:

dry strengths—319 (60%), 268 (60%), 293 (100%) and 258 (40%)

corresponding wet strengths—194 (40%), 242 (40%), 173 (80%) and 205 (60%) (4 hour boil)

An alkaline solution of methylolated kraft lignin was combined with the resole (see above) to produce binders with various ratios of methylolated lignin solids to resole solids. Poplar plywood samples were prepared as above and their shear strength determined (Table 3).

Table 3

| Ratio Methylolated Lignin Solids to Resole Solids | Dry Strength | Wet Strength (4 hour boil) |
|---|---|---|
| 7.2 to 1 | 235 (0%) | 119 (0%) |
| 6.5 to 1 | 160 (0%) | 72 (0%) |
| 2.8 to 1 | 224 (0%) | 190 (0%) |
| 1.7 to 1 | 273 (0%) | 187 (0%) |
| 1.1 to 1 | 273 (0%) | 186 (0%) |

These results demonstrate that curing the binder under alkaline conditions in the presence of a non-fugitive base does not result in sufficient cross linking to give a waterproof bond i.e. no wood failure. However when the binder is applied in a fugitive base (NH₄OH) the pH eventually reaches acidic values since the base is lost during application and pressing.

EXAMPLE 8

Demonstrating a Method of Obtaining a Semi-purified Binder from Methylolated Crude Black Liquor (a) Binders from methylolated crude black liquor and the resoles may be obtained in a semi-purified form, i.e., either as a filterable precipitate or as a high viscosity liquid layer or semi-solid mass which is not filterable, depending to some extent on the amount and the dilutability of the resole used. When combined with the methylolated crude black liquor dispersion (example 1) the more highly dilutable resoles yield a high viscosity liquid layer or a semi-solid mass which is not filterable while resoles which have very low dilutability yield a filterable precipitate. In this way the binder can be separated from most of the soluble salts and other impurities which remain in the liquid phase.

The methylolated crude black liquor and the resole were combined to produce a semi purified binder as follows:

As a high viscosity liquid or semi-solid; methylolated black liquor (6,134 g) at 44.5 percent solids is acidified to pH 5 with 678.5 g conc. H₂SO₄ slowly with stirring to yield a stable dispersion. To the dispersion is added with stirring 895.4 g dilutable resole (see example 3) at 53.8% total solids (the ratio to total methylolated black liquor solids to resole solids is 85:15). The mixture is allowed to stand for approximately 1 hour during which time the resole associates with or partially dissolves the precipitated lignin and the two separate out as a semi-solid or highly viscous complex from which the clear, dark brown, supernatent liquid may be removed by decantation. Approximately 2624 g of semi-solid binder was recovered containing 76.2% total solids. Assuming all the resole solids have been incorporated into the binder (which is not exactly true since the resole will contain some soluble salts) the resole represents 24.1% of the total solids of the recovered binder. Solid material recovered represents 62.3% of the theoretical solids. Dissolved salts, sugars, hemicellulose, etc., will remain largely in the supernatant liquid. (4631 g of liquid was recovered containing 32.1% solids). This semi-solid binder may be solubilized in a small amount of methanol or other suitable solvent and utilized in coatings, as a wet adhesive for plywood or composites, etc., or it may be dissolved in NH₄OH and spray dried and utilized as a powder adhesive for waferboard, particle board, etc.

(b) To obtain the binder complex as a filterable precipitate 50.7 g of resole of low dilutability (such as example 3) at 52% solids is added to 300 g of methylolated black liquor at 50% solids. The binder complex is precipitated with the addition of conc. $H_2SO_4$ with high speed mixing to bring the pH to 5, while still mixing 600 g of water are added. The precipitate is allowed to settle and the supernatant liquid is decanted. The precipitate is washed with an additional 600 g water and vacuum filtered and dried under vacuum. Yield is 63 g. This powder can be ball-milled to reduce the particle size and utilized as a powder adhesive (see example 9), or redispersed in water, etc.

EXAMPLE 9

Demonstrating the Use of the Semi-purified Binder as a Powder Adhesive

Powder adhesives of 200 mesh size or finer were prepared according to example 8 from mixtures of the methylolated crude liquor and resole at ratios of 80/20, 85/15 and 90/10 respectively on a total solids to total solids basis. These powders were blended with poplar wafers at a moisture content of 4 percent which had previously been treated with wax at a 2% level on weight of wood. The wafers were formed and pressed at 400° F. and 1000 psi to give waferboards which had a density of approximately 42 pcf. After pressing the boards were reconditioned and their modulus of rupture determined dry and wet after 2 hours boiling according to the CSA0188 (1975) test method. Variables examined in addition to the different binders were the amount of binder added to the wafers and the pressing time.

Table 4

| Ratio Methylolated Crude Black Liquor Solids to Resole Solids | Amount of Binder weight % on weight of wood | Press Time (min) | MOR (psi) DRY | WET |
|---|---|---|---|---|
| 80/20 | 3 | 5 | 4200 | 2072 |
| 80/20 | 3 | 6 | 4048 | 2663 |
| 80/20 | 3 | 7 | 3978 | 2044 |
| 85/15 | 3 | 7 | 3463 | 1928 |
| 85/15 | 2.5 | 5 | 3652 | 685 |
| 85/15 | 2.5 | 6 | 3763 | 1652 |
| 85/15 | 2.5 | 7 | 3239 | 1775 |
| 85/15 | 2.5 | 7 | 3842 | 1876 |
| 90/10 | 3 | 7 | 3576 | 1470 |
| 90/10 | 2.5 | 7 | 3431 | 1226 |

The data in Table 4 show that MOR's equivalent to those obtained with commercial phenolic resins at equivalent amounts are obtained at an 18/15 methylolated crude to resole ratio at press times of 6 or 7 minutes.

EXAMPLE 10

Demonstrating the Use of the Semi-purified Binder as a Wet Adhesive

The semi-purified binder was prepared as a semi-solid precipitate (Example 8) starting with a total methylolated black liquor solids to resole solids ratio of 80:20. Methanol was added to this material slowly with stirring to produce a viscous solution with a non-volatile solids content of 55%. This binder solution was used as a wet adhesive to prepare 3-ply plywood samples (1 × 1 ft.) from 1/16 inch rotary cut yellow birch veneers (6% moisture content). The binder was applied at a rate of 8 g solids per square foot with a closed assembly period of 5 minutes. The panels were pressed at 350° F. and 200 psi for 10 minutes and tested according to the CSA Standard 0112-6-1961, Phenol and Resorcinol Base Resin Adhesives (High-Temperature-Curing). The shear strengths obtained for the various tests representing an average of 30 test specimens for each were as follows:
  dry strength—429 psi
  wet strength (48 hour soak at room temperature)—476 psi
  cyclic boil—375 psi
The minimum requirement for phenol and resorcinol base adhesives in each of these tests is 360 psi.

Experiments have shown that it is necessary to methylolate the kraft lignin in order to increase its reactivity so that it may be cross linked. However it is possible to use phenolic compounds which are not methylolated, for example, novalacs, resorcinol etc, as cross linking agents for the methylolated lignin to produce useful binders.

EXAMPLE 11

Demonstrating the Use of Non-methylolated Phenolic Compounds with Methylolated Kraft Lignin to Produce Suitable Binders 6 g of a commercial novolac powder (Union Carbide BRN 7174) was combined with 200g of a 25% solids ammonia solution of methylolated kraft lignin Indulin-AT (example 2). This binder solution was used to prepare 3-ply poplar plywood samples as previously described. Shear specimens showed an average dry strength of 279(2) and wet strength (4 hour boil) of 141(2).

Methylolated crude black liquor acidified to produce a dispersion as in example 1 was combined with an aqueous solution of 50% resorcinol at a total methylolated black liquor solids to resorcinol solids ratio of 80:20. The binder complex separated as a semi-solid precipitate which was decanted from the supernatant liquid and subsequently dissolved in a small amount of methanol to produce a viscous solution. This binder solution was used to prepare 2-ply birch plywood samples using an application rate of 9 g binder solids per square foot of surface and pressing conditions of 350° F. at 250 psi for 10 minutes. The shear specimens showed an average dry strength of 623 psi and a wet strength of 240 psi.

EXAMPLE 12

The procedures of examples 4 and 7 were repeated with adhesive compositions comprising methylolated crude liquor and various phenol-formaldehyde reaction products. The results are tabulated in Table 5 below.

Table 5

| Mole ratio Form-Phenol | Strength Dry (1) | Wet (2) | Wood Failure Dry (1) | Wet (2) |
|---|---|---|---|---|
| 0 - 1 | 232 | 141 | 0% | 0% |
| 1.5 - 1[a] | 305 | 249 | 20% | 30% |
| 3 - 1[a] | 307 | 239.5 | 30% | 50% |
| 1.5 to 2.0 - 1[b] | 309 | 247 | 40% | 60% |

[a]prepared in the laboratory
[b]commercial material

This data shows that unmethylolated phenol shows no wood failure while methylolated phenols containing varying amounts of formaldehyde do show wood failure.

Adhesives formulated according to the present invention may be used in diverse applications and it will be appreciated that the ratio of methylolated lignin to phenol or phenol formaldehyde may be adjusted depending upon the particular properties desired. For example, when used as a wet adhesive for bonding interior or exterior plywood or conventional particle board, relatively high wet strength must be obtained consistent with minimum cost and therefore as little as 5–10% of phenol will be employed. For powder adhesives, used to bond structural particle board, higher strengths are required and a miminum of 15% phenol will be necessary for forming wet and powder coatings and for laminating resins, the flow characteristics of the resin are the controlling factor and for this reason at least 30% phenol is normally employed for foundry resins for use in shell and core mouldings; insulating resins for bonding glass and other insulating powders and adhesives for non-woven fabrics a minimum of 15% phenol is normally required. In all cases the phenol content may range up to about 80%. As has been indicated extensive cross linking can only be achieved at acid pH levels, and a pH of 4–6 is preferred because, although operative at more acid levels, such levels tend to promote acid degradation of the resin and to aggravate corrosion problems in use.

We claim:

1. A process for producing a highly cross linkable methylolated kraft lignin resin which comprises reacting kraft or soda lignin under alkaline conditions with a methylolating agent to thereby produce methylolated lignin and subsequently mixing said methylolated lignin with a phenolic cross linking agent and providing a pH below 7 to produce an intimately associated resin complex of methylolated lignin and phenolic cross linking agent curable at elevated temperature.

2. A process as claimed in claim 1 wherein said kraft or soda lignin is contained in a kraft or soda process black liquor.

3. A process as claimed in claim 2 wherein the intimately associated complex forms a precipitate or separate liquid phase and is separated from residual mother liquor.

4. A process as claimed in claim 1 wherein said complex production and a subsequent curing are both carried out at a pH below about 7.

5. A process as claimed in claim 1 wherein said methylolating agent is selected from the group comprising formaldehyde, paraformaldehyde, hexamethylene tetramine, and other compounds which readily decompose to formaldehyde.

6. A process as claimed in claim 5 and wherein said phenolic cross linking agent is selected from the group comprising phenol, catechol, cresol and resorcinol monomers, alkyl and aryl substituted compounds of said monomers, and condensed said monomers with one of aldehydes and ketones.

7. A process as claimed in claim 6, wherein said phenolic cross linking agent is a phenol formaldehyde reaction product.

8. A process as claimed in claim 6, wherein said methylolated lignin and said phenolic cross linking agent are initially dissolved in a fugitive base.

9. A process as claimed in claim 8, wherein said methylolated lignin and a phenol formaldehyde reaction product are mutually dissolved in ammonium hydroxide.

10. A process as claimed in claim 2 wherein said methylolated lignin is precipitated from said black liquor by addition of acid, so as to form an acid aqueous dispersion thereof to which is added said phenolic cross linking agent to produce said intimately associated resin complex.

11. A process for producing a highly cross linked methylolated kraft lignin polymer resin which comprises: reacting an alkaline solution of kraft or soda lignin with formaldehyde to thereby produce methylolated kraft lignin, adjusting the pH of the solution to the range 5–7 uniformly mixing therewith at least 5% by weight of total resin solids of a phenol formaldehyde reaction product at a pH of 6.0–7.0 thereby producing an intimately associated resin complex, and curing said complex.

12. A process as claimed in claim 11 wherein said alkaline solution of kraft or soda lignin comprises a kraft or soda process black liquor.

13. A process for producing a highly cross linked methylolated kraft lignin polymer resin which comprises: reacting an alkaline solution of kraft or soda lignin with formaldehyde to thereby produce methylolated kraft lignin, separating said methylolated kraft lignin from said solution following precipitation with a mineral acid, dissolving said methylolated kraft lignin and a phenol formaldehyde reaction product in ammonium hydroxide as a fugitive base which dissipates sufficiently to provide acidic pH values during curing of said resin, and curing.

14. A highly cross linkable methylolated kraft lignin resin for use as a high wet strength adhesive, comprising an intimately associated resin complex of premethylolated kraft lignin with a phenolic cross linking agent, produced at a pH in the range 2–7.

15. A resin as claimed in claim 14 wherein said kraft lignin is contained in a kraft or soda process black liquor.

16. A resin as claimed in claim 14, in the form of a powder resulting from the removal of black liquor non-lignin materials.

17. A resin as claimed in claim 16 wherein said powder is dissolved in a solvent therefor.

18. A resin as claimed in claim 14 wherein said phenolic cross linking agent is selected from the group comprising phenol, catechol, cresol and resorcinol monomers, alkyl or aryl substituted compounds of said monomers and condensed said monomers with one of aldehydes and ketones.

19. A resin as claimed in claim 18 wherein said phenolic cross linking agent is a phenol formaldehyde reaction product.

20. A resin as claimed in claim 19 wherein said phenol formaldehyde reaction product is present in an amount between 5 and 80% by weight of total resin solids.

21. A composition of matter for use in a process for the production of a high wet strength adhesive, comprising a pre-methylolated kraft lignin and a phenolic cross linking agent dissolved in a fugitive base which dissipates sufficiently to provide acidic pH values during curing of said adhesive.

22. A composition of matter as claimed in claim 21 wherein said fugitive base is ammonium hydroxide.

* * * * *